(12) United States Patent
Urabe et al.

(10) Patent No.: US 8,381,696 B2
(45) Date of Patent: Feb. 26, 2013

(54) CYLINDER

(75) Inventors: Mitsuru Urabe, Saitama (JP); Hirokazu Murata, Saitama (JP)

(73) Assignees: Nippon Piston Ring., Ltd., Saitama (JP); Hino Jidosha Kabushikikaisha, Tokyo (JP)

( * ) Notice: Subject to any disclaimer, the term of this patent is extended or adjusted under 35 U.S.C. 154(b) by 225 days.

(21) Appl. No.: 12/680,960

(22) PCT Filed: Oct. 2, 2008

(86) PCT No.: PCT/JP2008/067951
§ 371 (c)(1),
(2), (4) Date: Jul. 20, 2010

(87) PCT Pub. No.: WO2009/044824
PCT Pub. Date: Apr. 9, 2009

(65) Prior Publication Data
US 2010/0288222 A1 Nov. 18, 2010

(30) Foreign Application Priority Data

Oct. 5, 2007 (JP) .................................. 2007-262737
Feb. 14, 2008 (JP) .................................. 2008-033380

(51) Int. Cl.
*F16J 10/04* (2006.01)
(52) U.S. Cl. .................................................. 123/193.2
(58) Field of Classification Search ............... 123/193.2, 123/193.4, 193.1, 668, 193.5; 29/888.061; 92/159
See application file for complete search history.

(56) References Cited

U.S. PATENT DOCUMENTS

| 2,085,976 A | * | 7/1937 | Heintz | ............................. 92/153 |
| 2,971,802 A | * | 2/1961 | Kennemer et al. | ................. 92/82 |
| 4,258,084 A | * | 3/1981 | Hayden, Sr. | ................... 427/239 |

(Continued)

FOREIGN PATENT DOCUMENTS

| DE | 10355685 A1 | 7/2005 |
| JP | 60-49243 U | 4/1985 |

(Continued)

OTHER PUBLICATIONS

International Search Report: PCT/JP2008/067951.

*Primary Examiner* — M. McMahon
(74) *Attorney, Agent, or Firm* — Ladas & Parry LLP

(57) ABSTRACT

A cylinder realizing reduced reciprocation friction between a piston ring and a bore surface of the cylinder in a region where the piston ring slides. The cylinder in which a piston slides on a bore surface of the cylinder. A plurality of recesses is formed in a stroke center region in the bore surface of the cylinder. The stroke center region is a region between an under face position of a ring groove for a bottom piston ring at a top dead center of the piston and a top face position of a ring groove for a top piston ring at a bottom dead center of the piston. The total of areas of all of the recesses is in the range of 1% to 80% when an area of the stroke center region is 100%, and the recesses are not formed in a region other than the stroke center region of the bore surface of the cylinder.

22 Claims, 11 Drawing Sheets

U.S. PATENT DOCUMENTS

| | | | |
|---|---|---|---|
| 5,516,213 A * | 5/1996 | Moriyama et al. | 384/292 |
| 6,095,690 A * | 8/2000 | Niegel et al. | 384/293 |
| 6,253,724 B1 * | 7/2001 | Han | 123/193.2 |
| 6,736,101 B2 * | 5/2004 | Kano et al. | 123/193.2 |
| 7,104,240 B1 * | 9/2006 | Vuk et al. | 123/193.2 |
| 7,171,936 B2 * | 2/2007 | Rein et al. | 123/193.4 |
| 7,267,045 B2 * | 9/2007 | Leweux et al. | 92/159 |
| 7,685,991 B2 * | 3/2010 | Cumming et al. | 123/305 |
| 2003/0192501 A1 * | 10/2003 | Ishikawa et al. | 123/193.2 |

FOREIGN PATENT DOCUMENTS

| | | |
|---|---|---|
| JP | 62-59743 U | 4/1987 |
| JP | 3-25073 U | 3/1991 |
| JP | 08-200145 A | 8/1996 |
| JP | 2004-340330 A | 12/2004 |
| JP | 2007-002989 A | 1/2007 |
| JP | 2007-046660 A | 2/2007 |

* cited by examiner

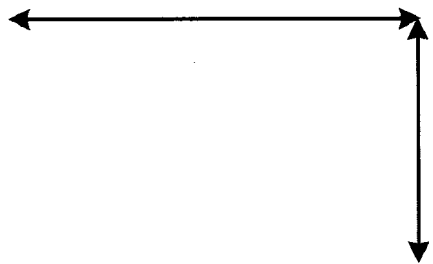

CYLINDER

TECHNICAL FIELD

The present invention relates to a cylinder in which a piston slides on a bore surface of the cylinder and, more particularly, to a cylinder realizing reduced reciprocation friction with a piston.

BACKGROUND ART

Environmental problems such as global warming are in the news on a global basis, so that development in the technique of improving fuel efficiency of an internal combustion engine for reducing $CO_2$ in atmosphere is a big challenge. As part of it, reduction in friction loss of a sliding member used for an engine or the like is in demand. In view of the demand, in recent years, the technique on material, surface process, and reforming technology of a sliding member having excellent wear resistance and scuffing resistance and capable of maximally expressing the effect of reducing frictional force is being developed.

To improve energy efficiency of an apparatus using a cylinder such as fuel consumption of an internal combustion engine, it is effective to reduce friction loss. Particularly, between a piston ring which reciprocates and the bore surface of a cylinder, reduction in friction is effective. To reduce the reciprocation friction, reduction in surface roughness of the bore surface of the cylinder is valid means. However, when surface roughness is too small, lubricating oil held in the bore surface hardly exists, and it causes an inconvenience such that scuffing resistance deteriorates. To improve the scuffing resistance, in Patent Document 1, a cylinder liner is formed so that the surface roughness of the bore surface of the cylinder liner increases from the top dead center side toward the bottom dead center side of the piston. However, in the Patent Document 1, the surface roughness at the bottom dead center and the stroke center region is large. Consequently, there is an inconvenience such that reciprocation friction increases.

Patent Document 2 discloses a technique of reducing reciprocation friction between a piston ring and a cylinder liner by forming depressions in the bore surface of the cylinder liner. In the Patent Document 2, the cylinder liner is divided into a plurality of regions in the axial direction of the cylinder according to variations in sliding speed and the shapes of the depressions are made different by regions, thereby enhancing the effect of reducing the reciprocation friction. However, in the Patent Document 2, a number of circular depressions are formed at least in portions around sliding ends at which a sliding member turns back of a sliding surface. Since the sliding speed decreases when the piston reaches the top dead center and the bottom dead center, in the case where the depressions are formed in the portions near the sliding ends, there is inconvenience such that the oil film becomes thin, metallic contact tends to occur, and friction increases.

Patent Document 1: Japanese Patent Application Publication No. 8-200145
Patent Document 2: Japanese Patent Application Publication No. 2007-46660

DISCLOSURE OF THE INVENTION

Problems to be Solved by the Invention

The present invention has been achieved in view of the problems and an object of the invention is to provide a cylinder realizing reduced reciprocation friction between a piston ring and the bore surface of the cylinder in a region where the piston ring slides.

Means for Solving the Problem

To achieve the object, the present invention provides a cylinder in which a piston slides on abore surface of the cylinder, wherein a plurality of recesses is formed in a stroke center region in the bore surface of the cylinder, the stroke center region is a region between an under face position of a ring groove for a bottom piston ring at a top dead center of the piston and a top face position of a ring groove for a top piston ring at a bottom dead center of the piston, total of areas of all of the recesses is in the range of 1% to 80% when an area of the stroke center region is 100%, and the recesses are not formed in a region other than the stroke center region of the bore surface of the cylinder.

In the invention, the surface process of the bore surface of the cylinder is made different according to the position of the cylinder axial direction. Consequently, in the region where the piston ring slides, the reciprocation friction between the piston ring and the bore surface of the cylinder can be reduced. By setting the formation area ratio of the recesses in the stroke center region within the range, the contact area becomes smaller, and the frictional force caused by shear resistance of the lubricating oil can be maintained to be small.

In the present invention, a cylinder liner is fixed to an inside of the cylinder, and the plurality of recesses may be formed in the bore surface of the cylinder liner. Even in the case where recesses as described above are formed in the bore surface of the cylinder liner fixed to the inside of the cylinder and the piston slides on the bore surface of the cylinder liner, the present invention can obtain effects similar to those of the case where the cylinder liner is not formed and the recesses are formed in the bore surface of the cylinder.

In the present invention, preferably, at least one of the plurality of recesses is formed in all of sections of a cylinder circumferential direction, in the stroke center region. By forming a plurality of recesses so as to overlap in the cylinder axial direction, the contact area can be reduced efficiently and uniformly.

In the present invention, preferably, a ten-point-height of roughness profile Rz in the region where the recesses are not formed, in the stroke center region is 4 µm or less. With the configuration, even in the case where the recesses are formed, reciprocation friction can be reduced. The ten-point-height of roughness profile Rz is specified by JIS B0601-1994.

In the present invention, an average length in cylinder axial directions of the recesses is preferably equal to or less than a length in a cylinder axial direction of the top piston ring among piston rings used. With the configuration, hermetic properties in the cylinder can be maintained high.

In the present invention, an average length in cylinder radial directions of the recesses is preferably in the range of 2 µm to 1,000 µm. With the configuration, the influence of shear resistance of the lubricating oil in reciprocation friction can be efficiently reduced.

In the invention, the cylinder may be used for an internal combustion engine. A cylinder is often used for an internal combustion engine, and it is a field where improvement in energy efficiency is particularly demanded. Therefore, by using the cylinder of the invention, a high effect can be obtained.

Effect of the Invention

The cylinder of the present invention produces an effect that, in a region where a piston ring slides, reciprocation friction between the piston ring and the bore surface of the cylinder can be reduced, and the energy efficiency of an apparatus using the cylinder can be improved.

Figure 1:
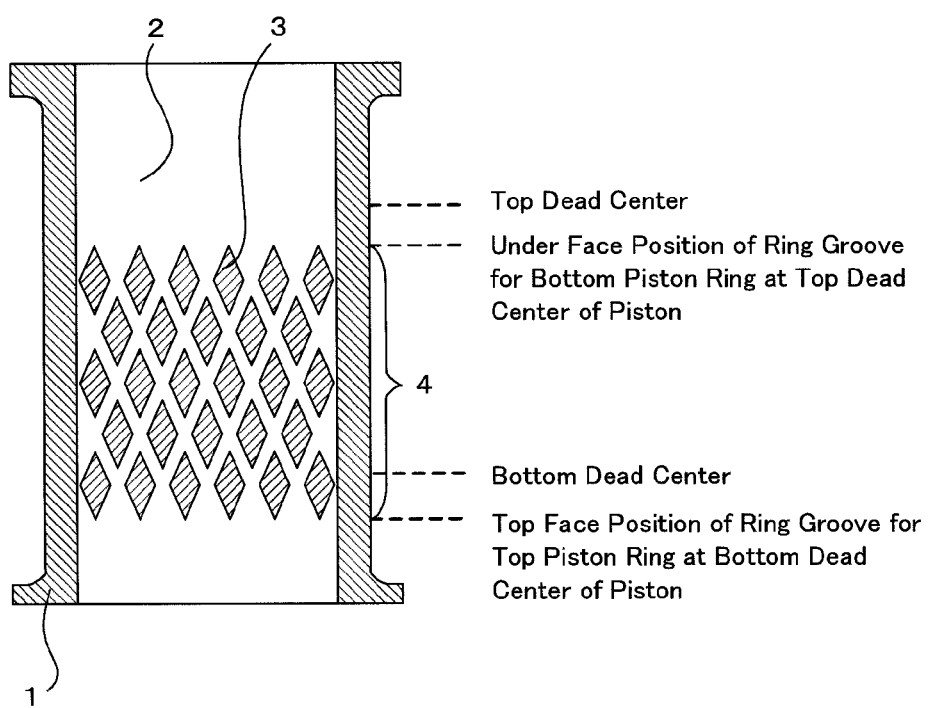
FIG. 1 is an explanatory diagram showing an example of a formation position of recesses in a cylinder liner bore surface fixed to the inside of a cylinder of the present invention.

| Description of Reference Numerals | |
|---|---|
| 1 | cylinder liner |
| 2 | bore surface |
| 3 | recess |
| 4 | stroke center region |

BEST MODES FOR CARRYING OUT THE INVENTION

A cylinder of the present invention is a cylinder in which a piston slides on a bore surface of the cylinder wherein, a plurality of recesses is formed in a stroke center region in the bore surface of the cylinder, the stroke center region is a region between an under face position of a ring groove for a bottom piston ring at a top dead center of the piston to a top face position of a ring groove for a top piston ring at a bottom dead center of the piston, total of areas of all of the recesses in the bore surface of the cylinder is in the range of 1% to 80% when an area of the stroke center region is 100%, and the recesses are not formed of a region other than the stroke center region.

The cylinder of the present invention is not limited as long as recesses as described above are formed. The cylinder of the invention produces an effect of reducing reciprocation friction with a piston by the shape of the bore surface in which the recesses are formed. As long as a cylinder is used in combination with a piston and the piston slides on the bore surface of the cylinder, a similar effect can be obtained regardless of factors such as the use, kind, and material of the cylinder. Consequently, the cylinder of the invention can be also used as cylinders for an internal combustion engine such as an engine of a vehicle or an airplane, an external combustion engine such as a stirling engine and, in addition, an engine, which is not a thermal engine, such as a compressor.

There is a cylinder in which a cylinder liner is fixed and a piston slides on the bore surface of the cylinder liner (hereinbelow, the cylinder may be described as a cylinder liner type), and there is a cylinder in which the cylinder liner is not fixed and a piston slides directly on the bore surface of the cylinder (hereinbelow, the cylinder may be described as a liner-less type). The present invention can be applied to the cylinders regardless of the presence or absence of the cylinder liner.

In the following, the embodiments (cylinder liner type and liner-less type) of the present invention will be described.

A. First Embodiment

Cylinder Liner Type

In a cylinder of the first embodiment of the present invention, a cylinder liner is fixed to the inside of the cylinder, and the plurality of recesses is formed in the bore surface of the cylinder liner. In the embodiment, the bore surface of the cylinder and the outer wall surface of the cylinder liner are fixed, and the piston slides on the bore surface of the cylinder liner. Consequently, the recesses may not be provided for the bore surface of the cylinder to which the outer wall surface of the cylinder liner is fixed. Instead, the recesses are formed in the bore surface of the cylinder liner on which the cylinder actually slides.

In the following, the cylinder of the embodiment will be described with reference to the drawings. FIG. 1 is an explanatory diagram showing an example of a formation position of recesses in the cylinder liner bore surface of the cylinder liner fixed to the inside of the cylinder of the embodiment. As shown in FIG. 1, a plurality of recesses 3 is formed in a bore surface 2 of a cylinder liner 1 in the embodiment. The recesses 3 are formed only in a stroke center region 4 in the bore surface 2 of the cylinder liner 1, and no recesses 3 are formed in a region other than the stroke center region 4. The stroke center region 4 is a region between an under face position of a ring groove for a bottom piston ring at a top dead center of the piston and a top face position of a ring groove for a top piston ring at a bottom dead center of the piston.

Figure 2:
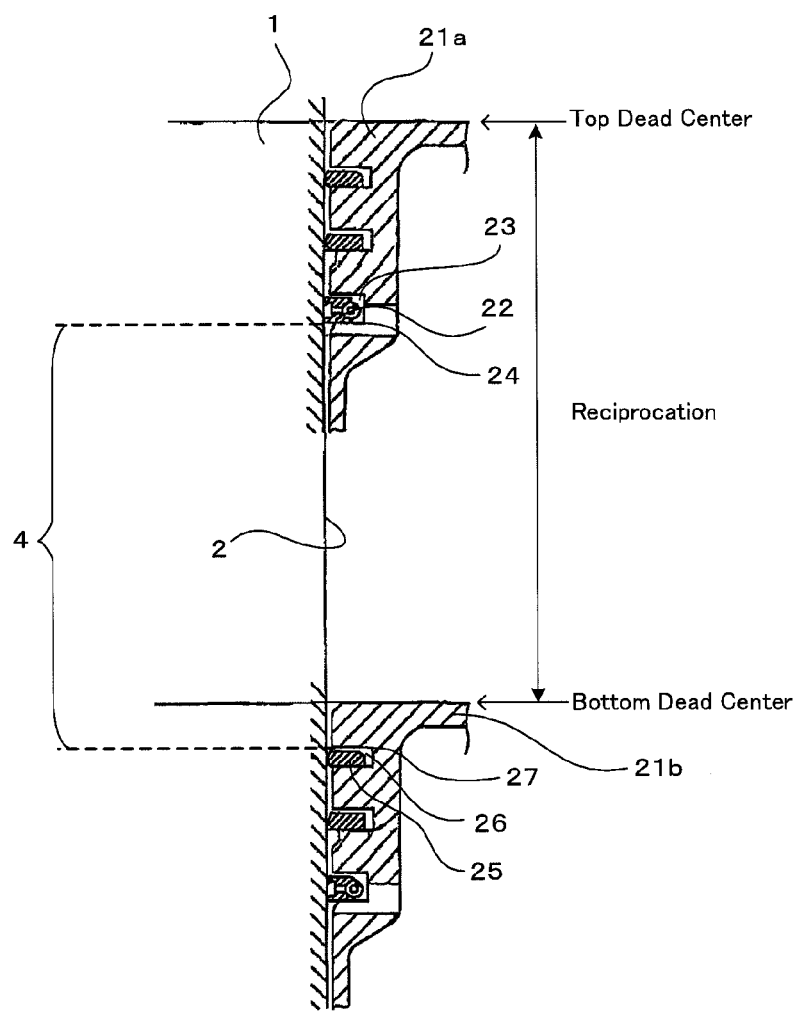
FIG. 2 is an explanatory diagram showing an example of a range of a stroke center region in the cylinder of the invention.
Figure 3A:
FIGS. 3A to 3J are schematic development diagrams showing examples of the shape of a recess formed in the cylinder of the invention.
Figure 3B:
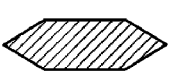
Figure 3C:
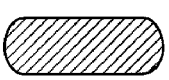
Figure 3D:
Figure 3E:
Figure 3F:
Figure 3G:
Figure 3H:
Figure 3I:
Figure 3J:

FIG. 2 is a schematic cross section showing an example of the range of the stroke center region 4, in the cylinder liner fixed to the inside of the cylinder of the embodiment. FIG. 2 is a cross section showing both a piston 21a at the top dead center stop position and a piston 21b at the bottom dead center stop position when the piston reciprocates. The stroke center region 4 is a region, in the bore surface 2 of the cylinder liner 1, from the position of an under face 24 of a ring groove 23 for a bottom piston ring 22 of the piston 21a in the top dead center stop position to the position of a top face 27 of a ring groove 26 for a top piston ring 25 at a bottom dead center stop position 21b. FIG. 2 shows the piston having a configuration using three piston rings (a first pressure ring, a second pressure ring, and an oil control ring). A bottom piston ring 22 is the oil control ring, and the top piston ring 25 is the first pressure ring.

To improve energy efficiency of an apparatus to which the cylinder is used, for example, to improve fuel consumption of an engine, it is effective to reduce friction loss between a piston ring and the bore surface of a cylinder (in the embodiment, the bore surface of the cylinder liner). Although the method of reducing the friction loss varies according to sliding conditions, particularly, since the piston has characteristics such as that the speed becomes zero at the top and bottom dead centers, the method varies according to the position of sliding. Consequently, in the cylinder liner attached to the inside of the cylinder of the embodiment, by forming recesses only in the stroke center region in the bore surface of the cylinder liner, the frictional force can be reduced in the region of all of the sliding process.

Specifically, near the top dead center and near the bottom dead center at which the movement speed of the piston is relatively low, by reducing surface roughness of the bore surface of the cylinder liner, reciprocation friction can be reduced. However, in the stroke center region as a region in which speed of sliding between the bore surface of the cylinder liner and the piston ring is high, the influence of shear resistance of lubricating oil is large. Consequently, in the embodiment, by forming recesses in the stroke center region in the bore surface of the cylinder liner fixed to the inside of the cylinder, the contact area between the piston ring and the bore surface of the cylinder liner is reduced. It enables reduction in the influence of the shear resistance of lubricating oil.

In the case of forming recesses in the entire region in which the piston ring slides (forming recesses also in a region other than the stroke center region), the contact area becomes smaller, so that contact surface pressure increases. Near the top dead center and near the bottom dead center, boundary lubrication is obtained, so that the frictional force increases.

In the following, such a cylinder of the embodiment will be described in detail item by item.

1. Stroke Center Region

First, the stroke center region as a region in which the recesses are formed in the embodiment will be described.

In the embodiment, the "stroke center region" is, as described above, a region between an under face position of a ring groove for a bottom piston ring at a top dead center of a piston and a top face position of a ring groove for a top piston ring at a bottom dead center of the piston. For example, as shown in FIG. 2, in the case where three piston rings are disposed in order of a first pressure ring, a second pressure ring, and an oil control ring from the top of the piston, the upper end of the stroke center region is the position of the under face of the ring groove for the oil control ring, and the lower end is the position of the top face of the ring groove for the first pressure ring. In the embodiment, the recesses are formed only in the stroke center region, and no recesses are formed in the region other than the stroke center region. The embodiment is not limited to the configuration using the three piston rings but can be similarly applied to a configuration using two piston rings (one pressure ring and one oil control ring) and a configuration of one piston ring (a piston ring performing gas sealing and oil control).

2. Recess

Next, recesses formed in the stroke center region in the bore surface of a cylinder liner fixed to the inside of the cylinder of the embodiment will be described.

In the embodiment, the shape of the recess formed in the stroke center region is not particularly limited but can be properly adjusted according to factors such as a layout of the recesses. For example, as shown in FIGS. 3A to 3J, recesses having shapes constructed by a straight line and/or a curve line can be formed. The recess may have a horizontally-long shape like in FIGS. 3A to 3C, a vertically-long shape like in FIGS. 3D to 3G, or a shape having almost equal horizontal to vertical ratio like in FIGS. 3H to 3J.

In the embodiment, to efficiently and uniformly reduce the contact area, at least one recess out of the plurality of recesses is preferably formed in all of sections in the cylinder circumferential direction, in the stroke center region. In the case of considering the sections in the circumferential direction, if a recess is not formed in a certain section, when the piston ring passes through the section, the contact area between the piston ring and the bore surface of the cylinder liner is larger than that in the case where the piston ring passes through a section in which a plurality of recesses is formed. Due to this, in the case where the piston ring passes through the section in which no recess is formed, the influence of the shear resistance of the lubricating oil is large. As a result, reciprocation friction is large.

On the other hand, in the case where at least one recess out of the plurality of recesses is formed in all of sections in the cylinder circumferential direction, in the stroke center region as described above, also when the piston ring passes through any of the sections in the circumferential direction in the stroke center region, the contact area can be reliably and uniformly reduced. Thus, reciprocation friction can be reliably reduced and high reproduction frictional force reducing effect can be obtained.

Figure 4A:
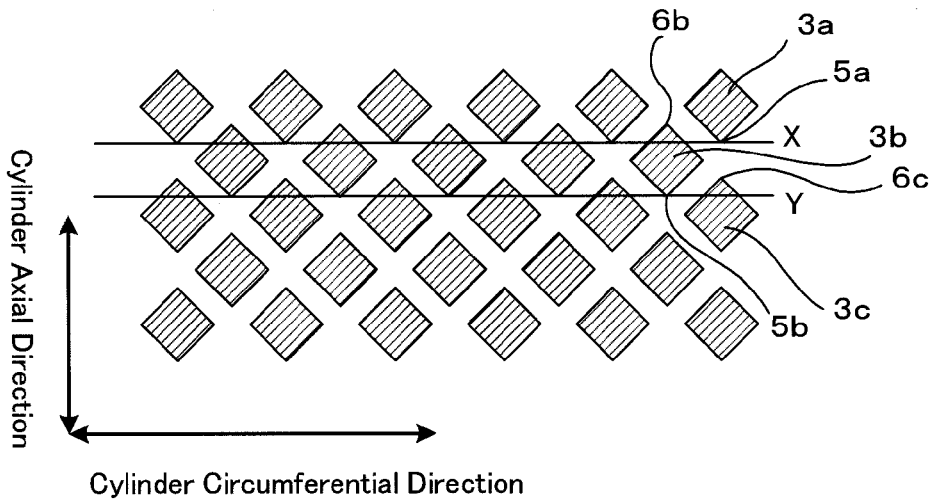
FIGS. 4A and 4B are each schematic development diagrams showing examples of the layout of recesses formed in the cylinder of the invention.
Figure 4B:
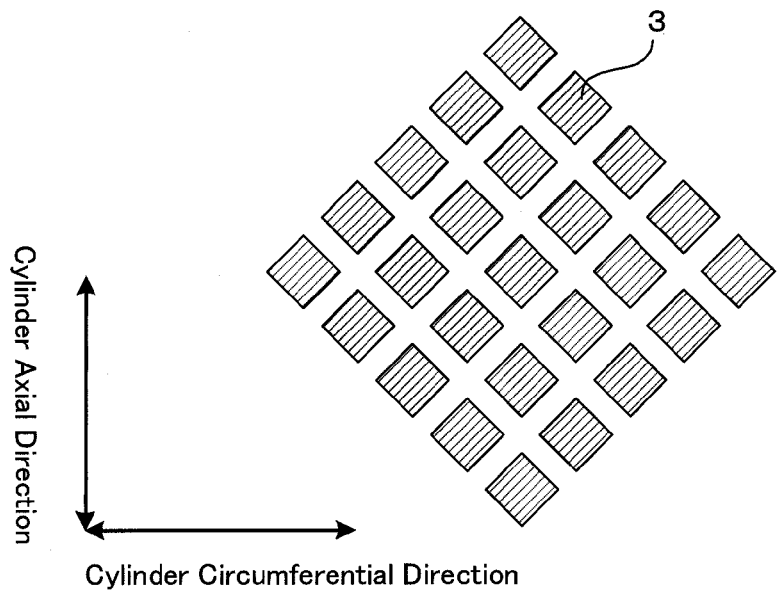

As examples of the state where "at least one recess out of the plurality of recesses is formed in all of sections in the cylinder circumferential direction" in the embodiment, the cases shown in FIGS. 4A and 4B can be mentioned. FIGS. 4A and 4B are schematic development diagrams showing an example of layout of the recesses 3 in the stroke center region 4 in FIG. 1. In FIGS. 4A and 4B, the vertical direction of the drawings is the axial direction of the cylinder, and the horizontal direction of the drawings is the circumferential direction of the cylinder. As shown in FIG. 4A, line X drawn in the cylinder circumferential direction corresponds to the lowest point 5a of a recess 3a, and the lowest point 5a is positioned below the highest point 6b of a closest recess 3b. Line Y drawn in the cylinder circumferential direction corresponds to the lowest point 5b of the recess 3b, and the lowest point 5b is positioned below the highest point 6c of the closest recess 3c. By disposing the recesses close to each other in the vertical direction so as to overlap in the cylinder axial direction, at least one recess out of the plurality of recesses can be formed in all of the cross sections in the cylinder circumferential direction. With the configuration, when the piston reciprocates, the contact area with the cylinder bore surface can be reduced at any position in the cylinder axial direction of the sliding piston ring in the stroke center region, and an effect of reduction in the reciprocation friction is produced.

FIG. 4B is also a schematic development diagram similar to FIG. 4A and shows an example of layout of the recesses 3 in the stroke center region 4 in FIG. 1. Also in FIG. 4B, the vertical direction of the drawing is the axial direction of the cylinder, and the horizontal direction of the drawing is the circumferential direction of the cylinder. In FIG. 4A, the recesses 3 are formed at an area ratio which is uniform in the cylinder axial direction (the ratio of the total area of all of the recesses when the area of the stroke center region is 100%). The invention is not limited to the embodiment. As shown in FIG. 4B, the area ratio of the recesses 3 may be low near the ends of the stroke center region 4 in the cylinder axial direction and may be high around the center of the stroke center region 4.

In the embodiment, the dimensions of the recess are not limited but can be properly adjusted according to factors such as the dimensions of the cylinder and the piston ring used together with the cylinder. Although the recess may be formed so as to penetrate the stroke center region in the cylinder axial direction, from the viewpoint of holding hermetic properties of the cylinder, average length in the cylinder axial direction of the recess is preferably equal to or less than length in the cylinder axial direction of a top piston ring among piston rings used. Average length in the cylinder axial direction of the recess is preferably equal to or larger than 0.2 mm, and more preferably 0.5 mm or larger so that the effect of forming the recesses can be sufficiently obtained.

The average length in the cylinder circumferential direction of the recess is preferably in the range of 0.1 mm to 15 mm, and more preferably, 0.3 mm to 5 mm. In the case where the average length in the cylinder circumferential direction of the recess is less than the range, the effect of forming the recesses may not be sufficiently obtained. On the contrary, in the case where the average length in the circumferential direction exceeds the range, an inconvenience such that a part of the piston ring gets in the recess, and the piston ring deforms may occur.

Preferably, the average length in the cylinder diameter direction of the recess is preferably in the range of 2 μm to 1,000 μm, particularly in the range of 2 μm to 500 μm, and more particularly in the range of 2 μm to 50 μm. In the case where the average length in the cylinder diameter direction of the recess is less than the range, there is the case that the effect of forming the recesses cannot be sufficiently obtained. On the contrary, in the case where the average length in the radial direction exceeds the range, an inconvenience such that processing is difficult and it is necessary to increase the length in the radial direction of the cylinder liner (increase the thickness) may occur.

In the embodiment, the average length in the cylinder circumferential direction between the recesses is preferably in the range of 0.1 mm to 15 mm, and more preferably in the range of 0.3 mm to 5 mm. In the case where the average length in the cylinder circumferential direction between the recesses is less than the range, the bore surface of the cylinder liner on which the piston ring slides is too narrow and the piston ring may not stably slide on the bore surface of the cylinder liner. On the contrary, in the case where the average length in the cylinder circumferential direction between the recesses exceeds the range, the effect of forming the recess may not be sufficiently obtained.

Figure 5A:
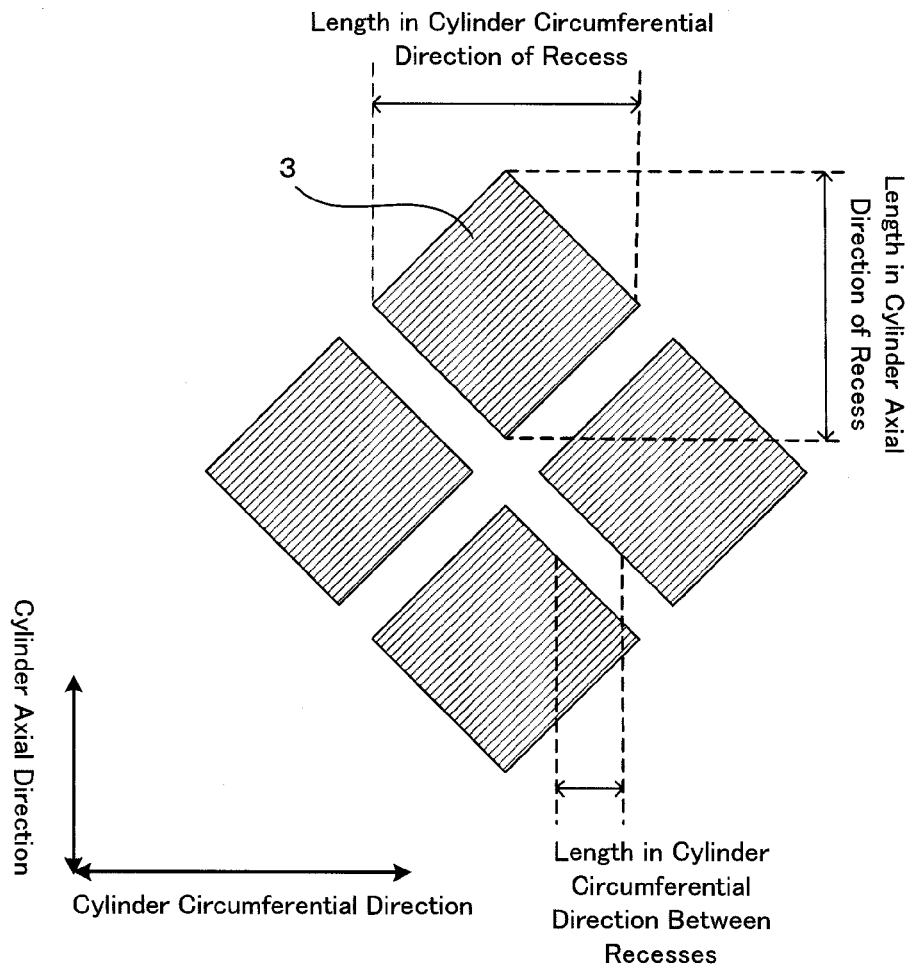
FIGS. 5A and 5B are each a schematic development diagram and a schematic cross section explaining the dimensions and position of a recess formed in the cylinder of the invention.
Figure 5B:
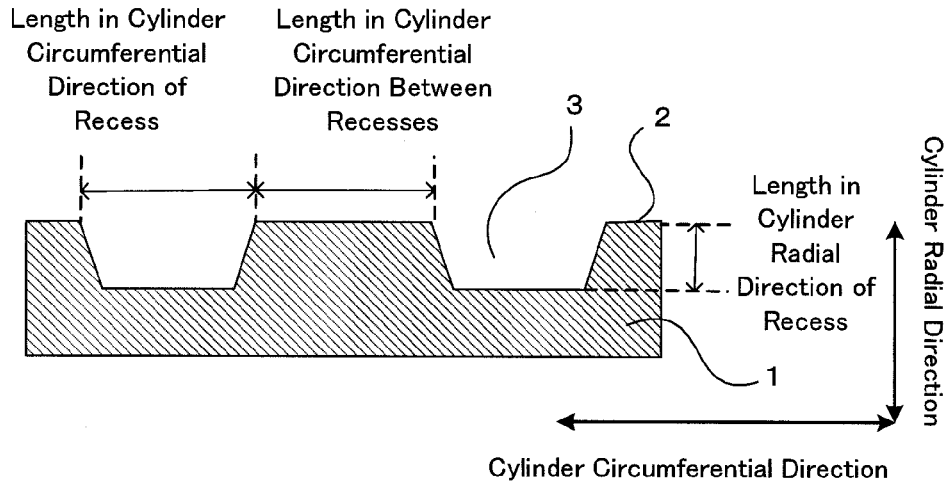

In the embodiment, the average length of the recesses denotes average length of each of parts shown in FIGS. 5A and 5B. FIG. 5A is a schematic development diagram whose vertical direction corresponds to the cylinder axial direction of the bore surface of the cylinder liner. FIG. 5B is a schematic cross section in the circumferential direction of the cylinder liner. As shown in FIG. 5A, the average length in the axial direction of the recess denotes average of lengths of the recesses 3 in the cylinder axial direction.

The average length in the circumferential direction of the recess 3 is an average of lengths of the recesses 3 in the cylinder circumferential direction as shown in FIG. 5A. As shown in FIG. 5B, the average length in the circumferential direction of the recess 3 denotes average of lengths in the surfaces including the bore surface 2, and the area of the recess denotes similarly.

The length in the radial direction of the recess 3 is average of lengths from the bottom surface of the recess 3 to the bore surface 2 of the cylinder liner 1, as shown in FIG. 5B. The average length in the circumferential direction of the cylinder between the recesses is average of the length between neighboring recesses 3 as shown in FIGS. 5A and 5B.

Figure 6A:
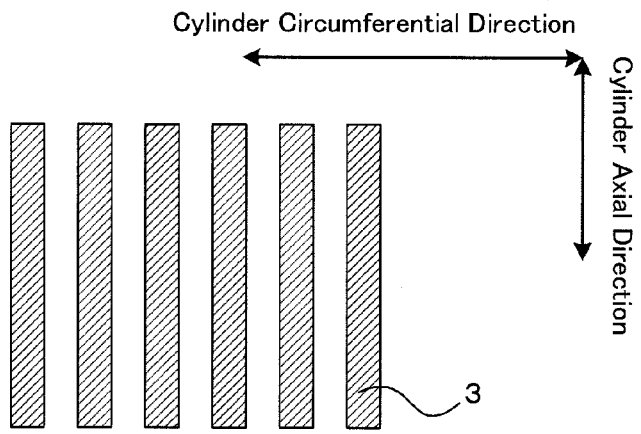
FIGS. 6A to 6D are schematic development diagrams showing another example of the layout of the recesses in the cylinder of the invention.
Figure 6B:
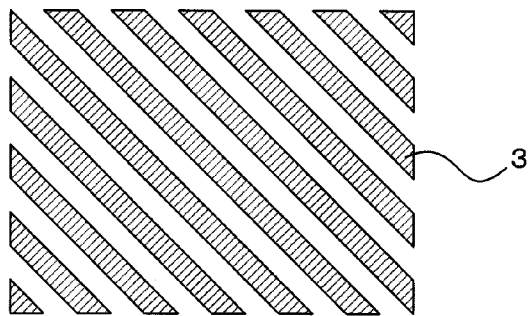
Figure 6C:
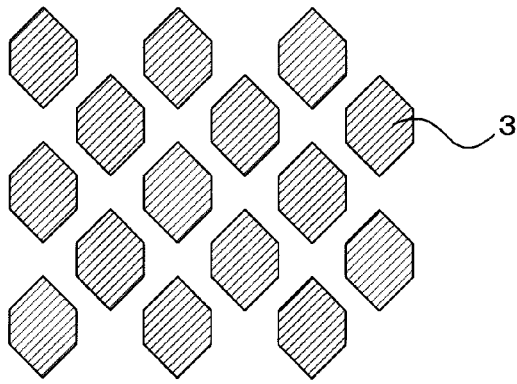
Figure 6D:
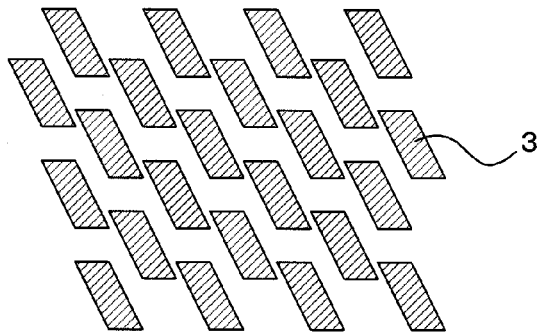

In the embodiment, the layout of the recesses is not particularly limited. For example, FIGS. 6A to 6D are development diagrams of developing the inner circumference of the cylinder liner to the circumferential direction. As shown in FIG. 6A, the recesses may be formed so as to penetrate the stroke center region in the cylinder axial direction. As shown in FIG. 6B, the recess may be formed in a spiral shape in the bore surface of the cylinder liner. As shown in FIGS. 6C and 6D, the recesses each having a specific length in the cylinder axial direction may be disposed at predetermined intervals. Further, the recesses may be disposed irregularly (at random) or regularly as shown in FIGS. 6A to 6D. In addition, the shapes and dimensions of a plurality of recesses formed in the bore surface of a single cylinder liner may be different from each other or the same.

In the embodiment, a plurality of recesses is formed only in the stroke center region. It is sufficient that total of areas of all of the recesses is in the range of 1% to 80% when area of the stroke center region is 100%, and the number of recesses formed per section in the cylinder circumferential direction or the like is not particularly limited. However, in the case such that the number of recesses formed in one section in the cylinder circumferential direction is too small, the effect of reducing the reciprocation frictional force obtained by forming the recesses and reducing the contact area may not be sufficiently obtained. Consequently, in the stroke center region, recesses are preferably formed to a degree that reciprocation frictional force reducing effect is obtained in all of the sections in the cylinder circumferential direction.

The recess to a degree that reciprocation frictional force reducing effect is obtained varies according to factors such as the speed of reciprocation of the piston used together. However, in the embodiment, the total of areas of all of the recesses is in the range of 1% to 80%, preferably in the range of 10% to 60%, and more preferably in the range of 20% to 50% when area of the stroke center region is 100%. When the area ratio is not in the range, the effect of forming the recesses may not be sufficiently obtained. When the area ratio exceeds the range, the contact area is too small, and an inconvenience such that the piston ring cannot stably slide on the bore surface of the cylinder liner may occur. From the viewpoint of the reciprocation frictional force reducing effect, the dimension of the recess has the preferable ranges as described above. Consequently, it is preferable to adjust the number of recesses formed per section in the cylinder circumferential direction so that the area ratio lies in the range in consideration of the preferable range of the dimensions of the recess.

Figure 7A:
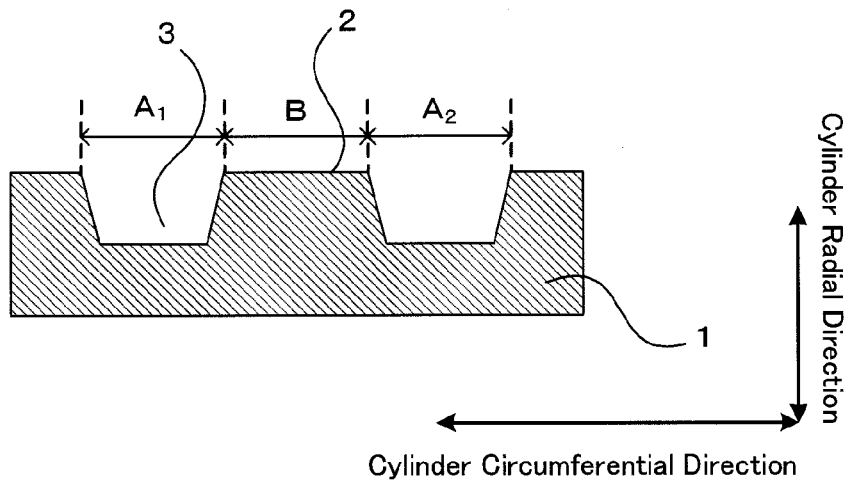
FIGS. 7A and 7B are each a schematic cross section and a schematic development diagram explaining the area ratio in the cylinder of the invention.
Figure 7B:
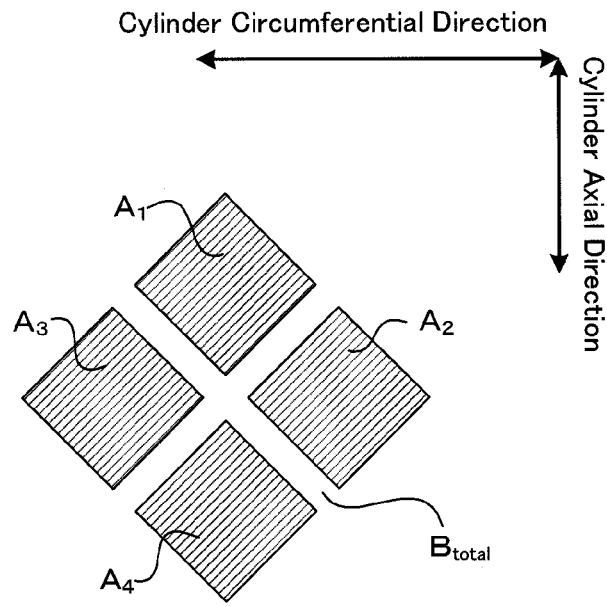

In the embodiment, "the total of areas of all of the recesses when area of the stroke center region is 100%" means the ratio of total of $A_1, A_2, A_3, \ldots, A_n$ in the area of the stroke center region when the areas of the recesses 3 are $A_1, A_2, A_3, \ldots, A_n$ as shown in FIGS. 7A and 7B. The area ratio is expressed by the following formula using total $A_{total}$ of the areas $A_1, A_2, A_3, \ldots, A_n$ of the recesses 3 in the stroke center region and total $B_{total}$ of areas B of the bore surface 2 other than the recesses 3 in the stroke center region. As shown in FIG. 7A, the area of the recess 3 is not the area of the bottom of the recess 3 but the area of the section including the bore surface 2.

$$\text{Area Ratio (\%)} = \frac{A_{total}}{A_{total} + B_{total}} \times 100 \quad \text{[Equation 1]}$$

$$A_{total} = A_1 + A_2 + A_3 + \ldots A_n$$

In the embodiment, the above-mentioned factors such as the shape, dimensions, layout, and area ratio of the recesses may be the same in the entire stroke center region or may vary according to regions. For example, in the stroke center region, the area ratio may vary among regions in the cylinder axial direction. As shown in FIG. 4B, the area ratio of the recesses may be low in upper and lower parts (near ends) of the stroke center region and may be high in the center portion of the stroke center region. The area ratio or the like may vary step by step or continuously.

3. Cylinder Liner

A cylinder liner in the embodiment is used by being fixed to the bore of a cylinder which is used in combination with a piston. A piston ring attached to the piston slides on the bore surface of the cylinder liner. In the cylinder liner fixed to the inside of the cylinder of the embodiment, a plurality of recesses is formed only in the stroke center region. It is sufficient that the total of areas of all of recesses is in the range of 1% to 80% when the area of the stroke center region is 100%. Factors such as the dimensions and material of the cylinder liner may be properly adjusted according to the dimensions of the cylinder used together, operating temperature, and the like.

In the embodiment, from the viewpoint of reducing reciprocation friction between the piston ring and the bore surface of the cylinder liner, the ten-point-height of roughness profile Rz in the region where the recesses are not formed, in the stroke center region is preferably 4 µm or less, more preferably 2 µm or less, and further more preferably 1 µm or less. In the embodiment, preferably, all of regions in which the piston ring slides such as the region near the top dead center, the region near the bottom dead center, and the stroke center region in the bore surface of the cylinder liner have the above-described surface roughness. The ten-point-height of roughness profile Rz is specified by JIS B0601-1994.

4. Cylinder

Any cylinder may be used in the embodiment as long as a cylinder liner in which recesses as described above are formed can be fixed to the inside of the cylinder. Factors such as the dimensions and material of the cylinder can be properly adjusted according to the dimensions, operating temperature, and the like of an engine, a compressor, or the like to which the cylinder is used.

B. Second Embodiment

Liner-Less Type

In a cylinder of a second embodiment of the invention, a cylinder liner as in "First Embodiment" is not fixed, but the recesses are formed directly in the bore surface of the cylinder, and a piston slides directly on the bore surface of the cylinder.

Any cylinder may be used in the embodiment as long as recesses as described above are formed in the bore surface of the cylinder. Factors such as the dimensions and material of the cylinder can be properly adjusted according to the dimensions, operating temperature, and the like of an engine, a compressor, or the like to which the cylinder is used. There is a case that surface process is performed on the bore of the cylinder. The embodiment can be applied regardless of factors such as the presence/absence of such a surface process and the quality of the cylinder base material.

In the embodiment, from the viewpoint of reducing reciprocation friction between the piston ring and the bore surface of the cylinder, the ten-point-height of roughness profile Rz in the region where the recesses are not formed, in the stroke center region is preferably 4 µm or less, more preferably 2 µm or less, and further more preferably 1 µm or less. In the embodiment, preferably, all of regions in which the piston ring slides such as the region near the top dead center, the region near the bottom dead center, and the stroke center region in the bore surface of the cylinder have the above-described surface roughness. The ten-point-height of roughness profile Rz is specified by JIS B0601-1994.

Since the cylinder of the embodiment is similar to the cylinder of the cylinder liner type of the "A. First Embodiment" except that the cylinder liner is not used and the recesses are formed in the bore surface of the cylinder, the description will not be repeated. That is, "1. Stroke center region" and "2. Recess" of the "A. First Embodiment" can be applied as they are for the liner-less type of the second embodiment. The cylinder of the second embodiment produces effects similar to those of the case of "A. First Embodiment" by forming the recesses as described above in the stroke center region in the bore surface.

The present invention is not limited to the foregoing embodiments. The embodiments are illustrative and any matter having substantially the same configuration as the technical idea described in the scope of claims of the invention and producing similar effect is included in the technical scope of the invention. For example, as the material of the cylinder bore surface of the invention, a conventionally used material such as aluminum, aluminum-based alloy, cast iron, cast steel, steel, or the like can be used.

EXAMPLES

The present invention will be described below more concretely by examples and comparative examples.

Example 1

A cylinder liner was processed by the following method, and reciprocation frictional force of the cylinder liner was measured.

(Processing on Cylinder Liner)

Figure 8:
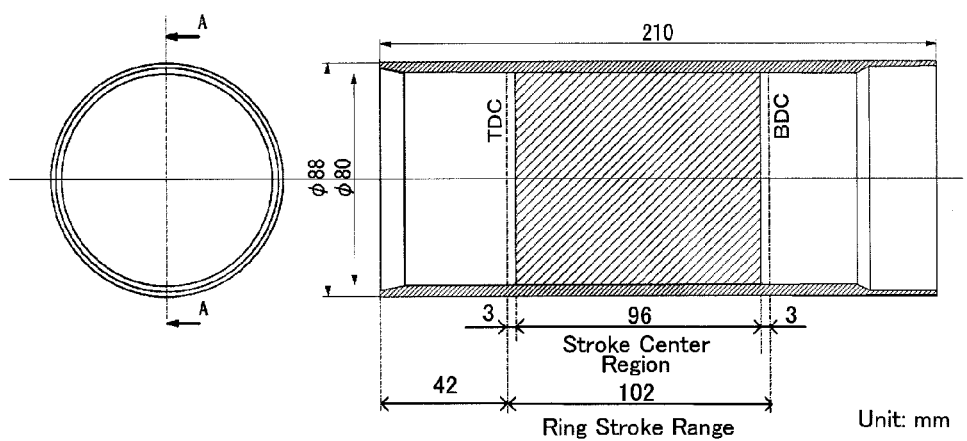
FIG. 8 is a schematic cross section showing dimensions of a cylinder liner used in an example of the invention.
Figure 9:
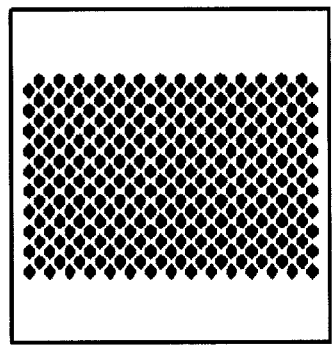
FIG. 9 is a schematic plan view showing a masking sheet used for forming recesses in the example of the invention.

Recesses were formed in the stroke center region of a cylinder liner (material: FC250) having a dimension (mm) shown in FIG. 8 with a masking sheet shown in FIG. 9 by the following procedure. The recesses were formed in the shape and layout shown in FIG. 5A.

(1) The masking sheet was adhered to the bore surface of the cylinder liner.

Figure 10:
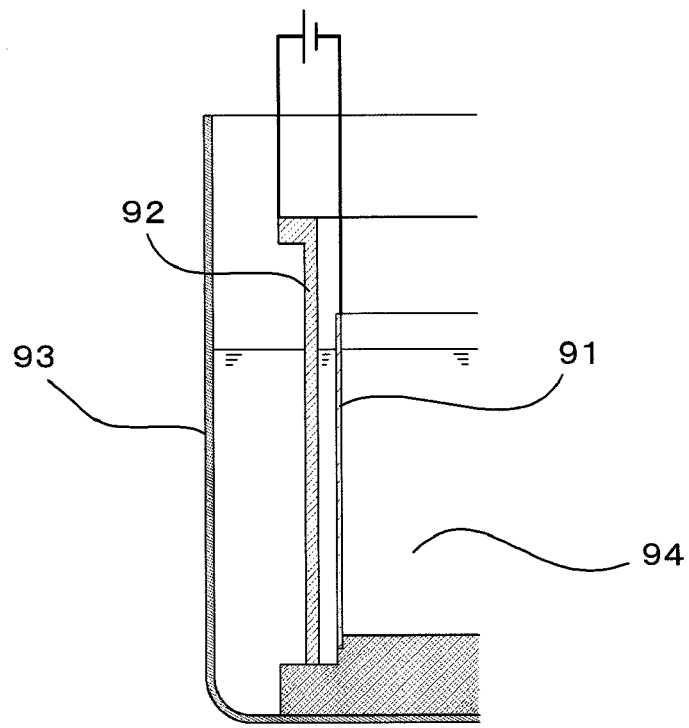
FIG. 10 is a schematic cross section showing a state at the time of formation of recesses in the example of the invention.

(2) As shown in FIG. 10, a cylinder 91 made by a copper sheet (sheet thickness: 0.5 mm and the outside diameter of the cylinder: 74 mm) was inserted in a cylinder liner 92 and fixed so that the clearance between the cylinder 91 made by a copper sheet and the cylinder liner 92 becomes uniform.

(3) The cylinder liner 92 of (2) was inserted in a container 93.

(4) A corrosion solution 94 was poured into the container 93.

(5) A voltage of 1.5 V was applied using the cylinder liner 92 as an anode and the copper-sheet cylinder 91 as a cathode to cause galvanic corrosion.

(6) After five-minute corrosion, the cylinder liner 92 was taken out from the container 93. As the dimensions of the recess, length in the cylinder circumferential direction was set to 0.8 mm, length in the cylinder axial direction was set to 0.8 mm, and the average length in the cylinder radial direction was set to 20 µm. The shape (dimension) of the recess was measured by transferring the shape of the cylinder bore surface by using resin with respect to the length in the cylinder circumferential direction and the length in the cylinder axial direction. The average length in the cylinder radial direction is an average value obtained by measurement by shifting a probe of a surface roughness/contour shape measuring device in the cylinder axial direction.

(Measurement of Reciprocation Frictional Force)

Figure 11:
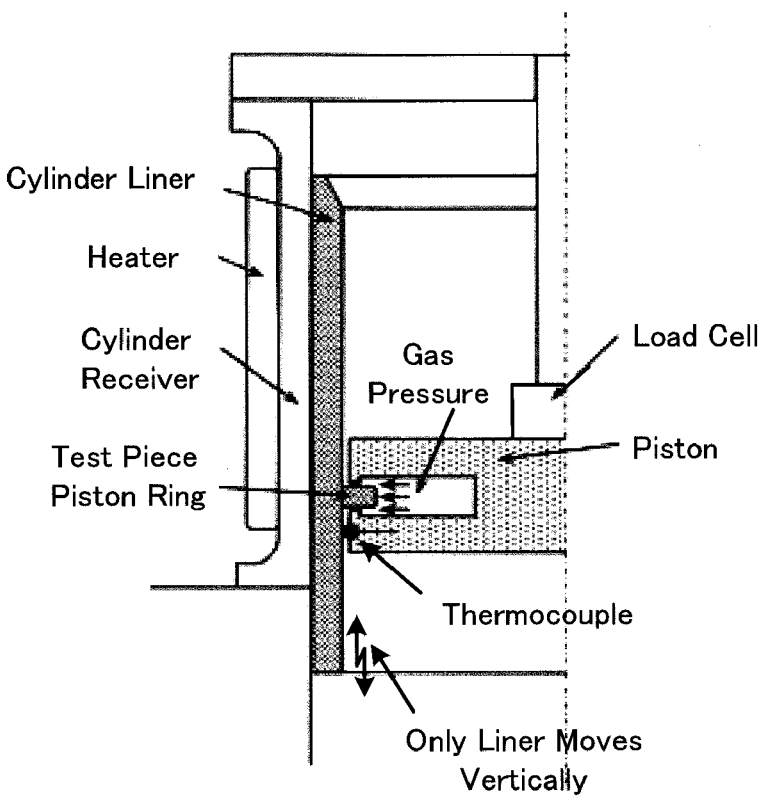
FIG. 11 is a schematic cross section showing the configuration of an apparatus used for measuring reciprocation friction in the example of the invention.

The reciprocation frictional force (N) of the cylinder liner processed by the above-described procedure was measured by using an apparatus shown in FIG. 11. Length h1 in the axial direction of a test specimen piston ring used was 1.2 mm, length a1 in the radial direction was 3.2 mm, and tension Ft in the tangent line direction of the piston ring was 9.8 N. The rotational speed at the time of measuring the reciprocation frictional force was 50 to 750 rpm, the piston ring ambient temperature was 80° C., and test oil having SAE viscosity of 10 W to 30 was used.

(Evaluation)

Figure 12:
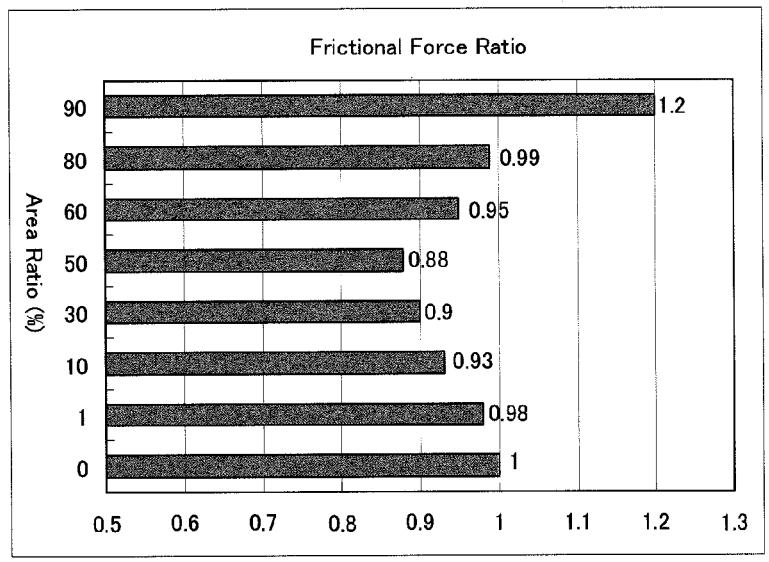
FIG. 12 is a graph showing a measurement result in the example of the invention.

FIG. 12 shows a measurement result in the case where the area ratio is 0%, 1%, 10%, 30%, 50%, 60%, 80%, and 90% when the ten-point-height of roughness profile Rz in the area where no recesses are formed in the bore surface of the cylinder liner was 2 µm, the average length in the cylinder radial direction of the recess was 10 µm, and the rotational speed was 750 rpm. FIG. 12 shows the frictional force ratio when the frictional force of a conventional item in which the recesses are not formed and the area ratio is 0% is set to 1.00. It is understood from FIG. 12 that the frictional force decreases effectively when the area ratio is in the range of 1% to 80% and becomes the minimum when the area ratio is 50%. The reason is considered as follows. When the area ratio is increased to 50%, the frictional force decreases due to the effect of decrease in the contact area. When the area ratio exceeds 50%, the contact area becomes smaller, so that the surface pressure of the sliding part becomes excessively high, and the frictional force increases.

Figure 13:
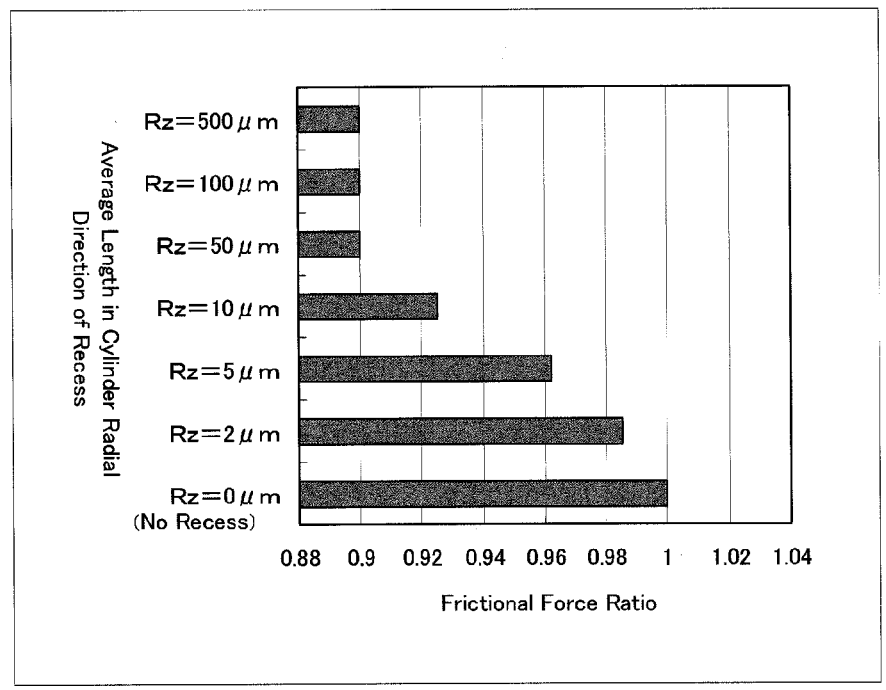
FIG. 13 is a graph showing another measurement result in the example of the invention.

FIG. 13 shows a measurement result in the case where the average length in the cylinder radial direction of the recess was 0 µm, 2 µm, 5 µm, 10 µm, 50 µm, 100 µm, and 500 µm when the ten-point-height of roughness profile Rz in the area where no recesses are formed in the bore surface of the cylinder liner was 2 µm, the area ratio was 50%, and the rotational speed was 750 rpm. FIG. 13 shows the frictional force ratio when the frictional force of a conventional item in which the recesses are not formed and the average length in the cylinder radial direction of the recess is 0 µm is set to 1.00. It is understood from FIG. 13 that the frictional force is reduced effectively when the average length in the cylinder radial direction of the recess is 5 µm or more. Since normal oil film thickness is considered as about 5 µm, by setting the average length in the cylinder radial direction of the recess to 5 µm or more, the lubricant oil can be temporarily saved in the recess when the piston ring passes. Therefore, the cylinder is insusceptible to shear resistance of the lubricating oil.

Figure 14:
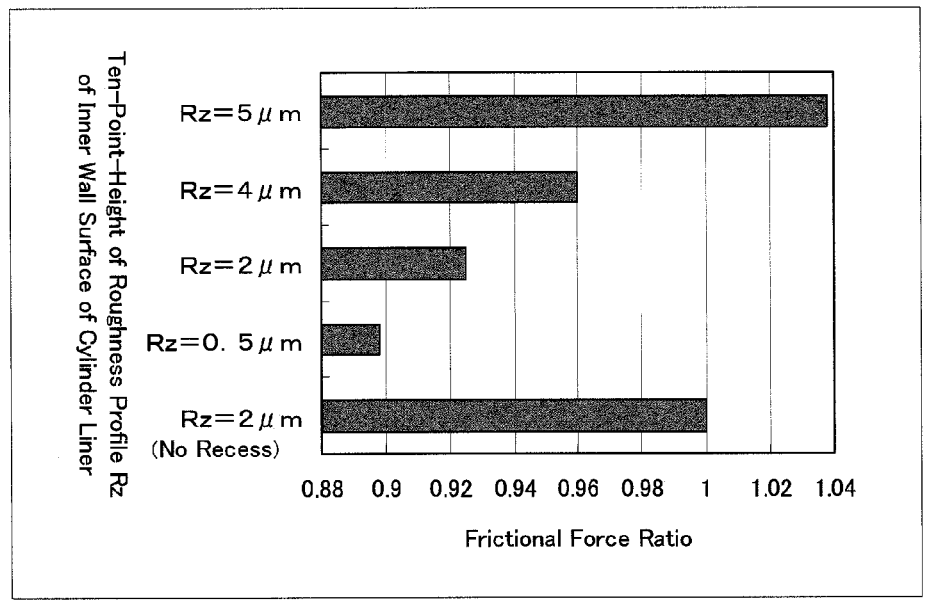
FIG. 14 is a graph showing yet another measurement result in the example of the invention.

FIG. 14 shows a measurement result in the case where the ten-point-height of roughness profile Rz of the bore surface of the cylinder liner was 0.5 µm, 2 µm, 4 µm, and 5 µm when the area ratio was 50%, the average length in the cylinder radial direction of the recess was 10 µm, and the rotational speed was 750 rpm. FIG. 14 shows the frictional force ratio when the frictional force of a conventional item in which the recesses are not formed and the ten-point-height of roughness profile Rz of the bore surface of the cylinder liner is 2 µm is set to 1.00. It is understood from FIG. 14 that, even when the ten-point-height of roughness profile Rz is the same, the frictional force of the cylinder liner in which the recesses are formed is largely reduced as compared with that of a cylinder liner in which the recesses are not formed. In the case where the recesses are formed, when the ten-point-height of roughness profile Rz exceeds 2 µm, the frictional force sharply increases. The reason is considered as follows. By forming the recesses, the contact area becomes smaller. As compared with the case where the recesses are not formed, the surface pressure in the sliding part becomes higher, and the cylinder is susceptible to the surface roughness of the sliding surface.

Example 2

Using the apparatus shown in FIG. 11, mechanical loss (FMEP) caused by frictional force was obtained. In a test method, a test piece piston ring was set in a piston, and running in operation was performed. After that, the rotational speed corresponding to engine speed was changed at an oil temperature of 80° C., and frictional force was measured. In the example, the frictional force was measured with respect to a cylinder liner (example 2) in which recesses are formed only in the stroke center region, a cylinder liner (comparative example 2-1) in which recesses are not formed, a cylinder liner (comparative example 2-2) in which recesses are formed only in sliding ends, and a cylinder liner (comparative example 2-3) in which recesses are formed in the sliding ends and the stroke center region. When the recesses were formed in the stroke center region, they were formed such that the total of areas of all of recesses becomes 50% when the area of the stroke center region is 100%. The sliding ends denote a region (the upper sliding end) from the upper end of the cylinder to the position of the under face of the ring groove for the test piece piston ring at the top dead center of the piston and a region (the lower sliding end) from the position of the top face of the ring groove for the test piece piston ring at the bottom dead center of the piston to the lower end of the cylinder liner, of the cylinder liner of the apparatus illustrated in FIG. 11.

Figure 15:
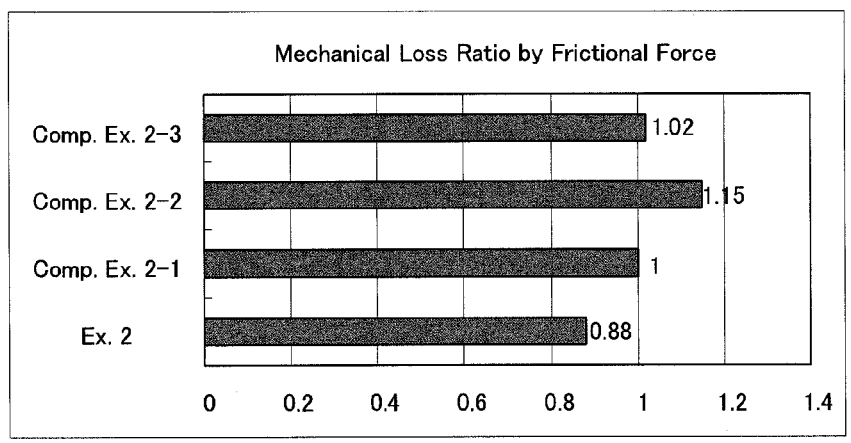
FIG. 15 is a graph showing still another measurement result in the example of the invention.

FIG. 15 shows a measurement result. FIG. 15 shows the mechanical loss ratios of cylinder liners when the mechanical loss of the cylinder liner of comparative example 2-1 in which no recesses are formed is 1. It is understood from FIG. 15 that the mechanical loss of cylinder liners of the example 2 in which recesses are formed only in the stroke center region is smaller than that of the comparative example 2-1 in which no recesses are formed and that of the comparative examples 2-2 and 2-3 in which recesses are formed in the sliding ends.

The invention claimed is:

1. A cylinder in which a piston slides on a bore surface of the cylinder, wherein a plurality of recesses is formed in a stroke center region in the bore surface of the cylinder, the stroke center region is a region between an under face position of a ring groove for a bottom piston ring at a top dead center of the piston and a top face position of a ring groove for a top piston ring at a bottom dead center of the piston, total of areas of all of the recesses is in the range of 1% to 80% when an area of the stroke center region is 100%, and the recesses are not formed in a region other than the stroke center region of the bore surface of the cylinder.

2. The cylinder according to claim 1, wherein a cylinder liner is fixed on an inside of the cylinder, and the plurality of recesses is formed in the bore surface of the cylinder liner.

3. The cylinder according to claim 1, wherein at least one of the plurality of recesses is formed in each of cross-sections of a cylinder circumferential direction, in the stroke center region.

4. The cylinder according to claim 2, wherein at least one of the plurality of recesses is formed in each of cross-sections of a cylinder circumferential direction, in the stroke center region.

5. The cylinder according to claim 1, wherein a ten-point-height of roughness profile Rz, specified by JIS B0601-1994, in the region where the recesses are not formed, in the stroke center region is 4 μm or less.

6. The cylinder according to claim 2, wherein a ten-point-height of roughness profile Rz, specified by JIS B0601-1994, in the region where the recesses are not formed, in the stroke center region is 4 μm or less.

7. The cylinder according to claim 4, wherein a ten-point-height of roughness profile Rz, specified by JIS B0601-1994, in the region where the recesses are not formed, in the stroke center region is 4 μm or less.

8. The cylinder according to claim 1, wherein an average length in cylinder axial directions of the recesses is equal to or less than a length in a cylinder axial direction of the top piston ring among piston rings used.

9. The cylinder according to claim 2, wherein an average length in cylinder axial directions of the recesses is equal to or less than a length in a cylinder axial direction of the top piston ring among piston rings used.

10. The cylinder according to claim 4, wherein an average length in cylinder axial directions of the recesses is equal to or less than a length in a cylinder axial direction of the top piston ring among piston rings used.

11. The cylinder according to claim 7, wherein an average length in cylinder axial directions of the recesses is equal to or less than a length in a cylinder axial direction of the top piston ring among piston rings used.

12. The cylinder according to claim 1, wherein an average length in cylinder radial directions of the recesses is in the range of 2 μm to 1,000 μm.

13. The cylinder according to claim 2, wherein an average length in cylinder radial directions of the recesses is in the range of 2 μm to 1,000 μm.

14. The cylinder according to claim 4, wherein an average length in cylinder radial directions of the recesses is in the range of 2 μm to 1,000 μm.

15. The cylinder according to claim 7, wherein an average length in cylinder radial directions of the recesses is in the range of 2 μm to 1,000 μm.

16. The cylinder according to claim 11, wherein an average length in cylinder radial directions of the recesses is in the range of 2 μm to 1,000 μm.

17. The cylinder according to claim 1, wherein the cylinder is used for an internal combustion engine.

18. The cylinder according to claim 2, wherein the cylinder is used for an internal combustion engine.

19. The cylinder according to claim 4, wherein the cylinder is used for an internal combustion engine.

20. The cylinder according to claim 7, wherein the cylinder is used for an internal combustion engine.

21. The cylinder according to claim 11, wherein the cylinder is used for an internal combustion engine.

22. The cylinder according to claim 16, wherein the cylinder is used for an internal combustion engine.

* * * * *

UNITED STATES PATENT AND TRADEMARK OFFICE
CERTIFICATE OF CORRECTION

PATENT NO. : 8,381,696 B2
APPLICATION NO. : 12/680960
DATED : February 26, 2013
INVENTOR(S) : Mitsuru Urabe et al.

It is certified that error appears in the above-identified patent and that said Letters Patent is hereby corrected as shown below:

Title Page - Item (73) Assignees:

"Nippon Piston Ring., Ltd." should be --Nippon Piston Ring Co., Ltd.--

Signed and Sealed this
Thirteenth Day of August, 2013

Teresa Stanek Rea
*Acting Director of the United States Patent and Trademark Office*